Patented May 7, 1929.

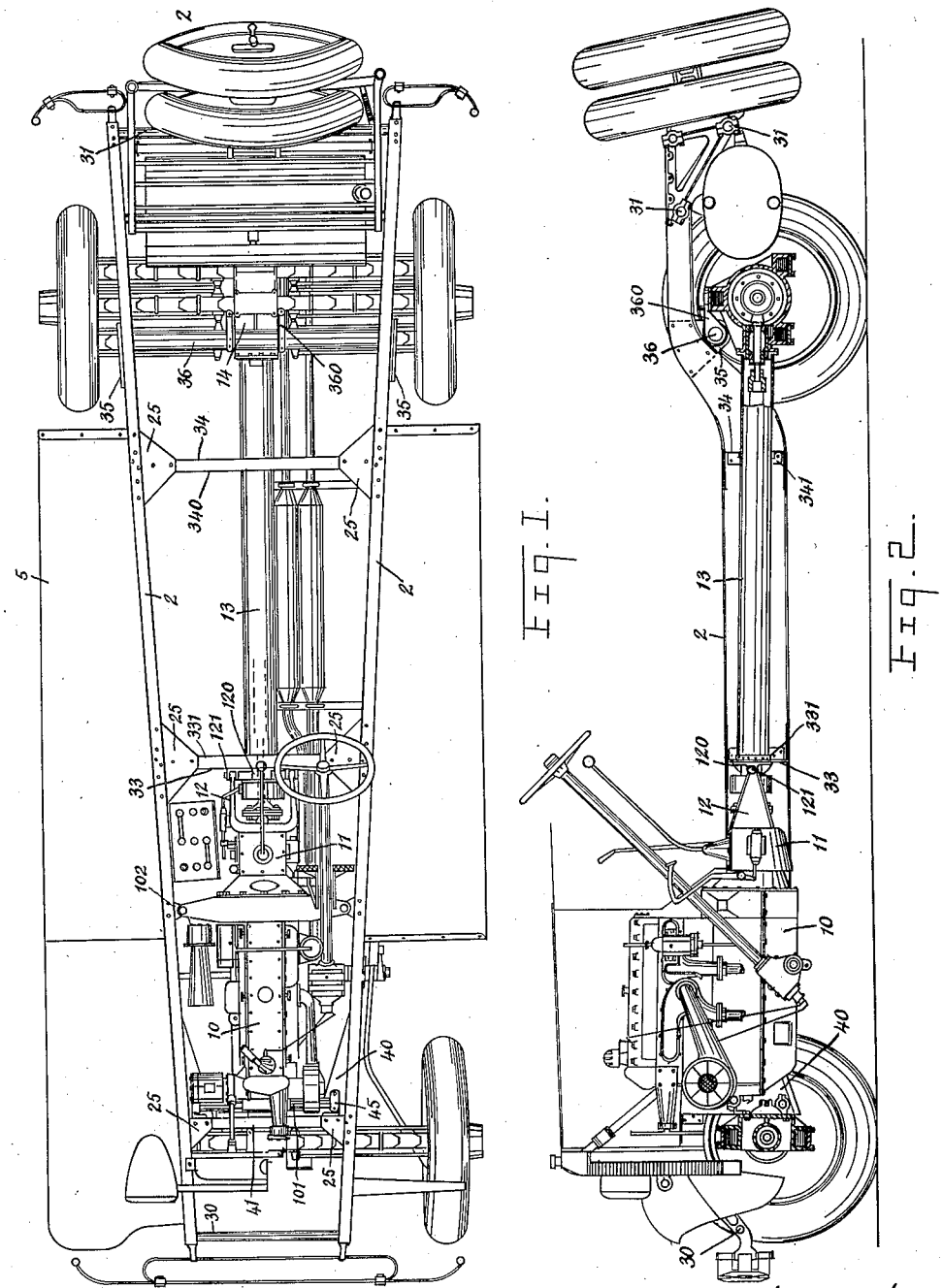

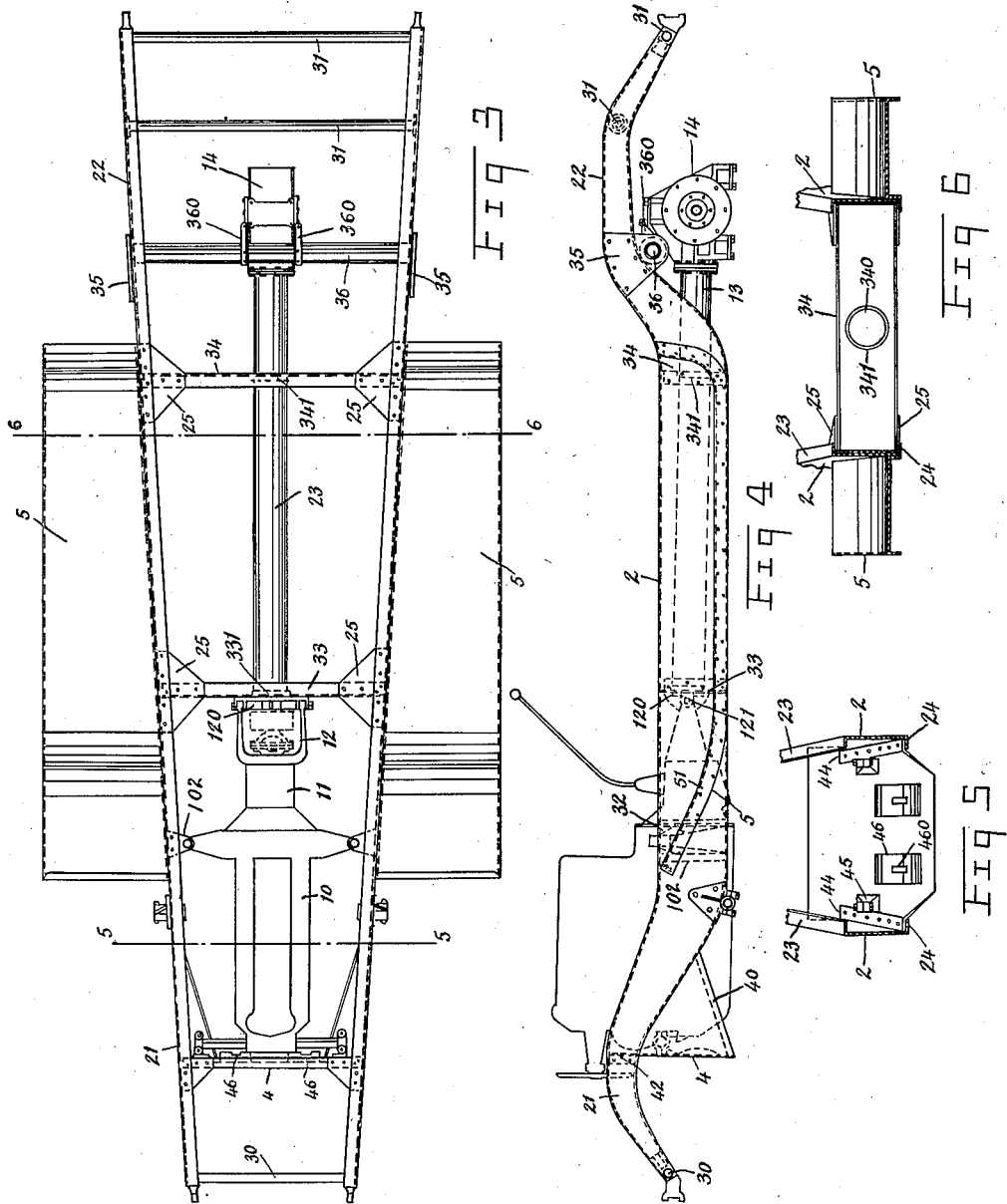

1,711,765

UNITED STATES PATENT OFFICE.

JAMES A. WRIGHT, OF MONTREAL, QUEBEC, CANADA.

MOTOR CHASSIS.

Application filed February 18, 1927. Serial No. 169,342.

This invention relates to motor vehicles, and more particularly to the construction and assembly of the chassis of such vehicles when mounted on transverse spring suspension.

The object of the invention is to provide an improved form of chassis having a frame of great rigidity.

A further object is to provide a frame having in addition to the usual side members and cross members, a central member secured to the side and cross members, the whole forming a substantially integral and rigid unit.

A further object is to provide a chassis having a novel power plant mounting.

A further object is to provide a chassis having cross members which will resist all torsional stresses.

Further objects will be set forth in the following specification.

Reference will be made to the accompanying drawings in which:

Figure 1 is a plan view.

Figure 2, is a side view with side frame member removed.

Figure 3 is a plan view of the frame.

Figure 4 is a side view of one of the side members.

Figure 5 is a cross sectional view looking forwards of the apron on the line 4—4 of Fig. 3.

Figure 6 is a cross sectional view looking towards the rear on the line 5—5 of Fig. 3.

The chassis is constructed with a frame which includes side girder members 2 with arched ends 21 and 22 which are narrowed as shown in Fig. 3. These members converge to the front end of the frame. They are directly connected at the front by cross tubes 30 and at the rear by tubes 31.

Between these side members is a composite central member, the power plant 10 comprising the engine, the transmission casing 11 and a yoke extension 12 thereto, the torque tube 13 and the differential casing 14 securely connected together to form an integral rigid unit extending between the front and rear wheel assemblies.

This central member is connected to the side members by a series of cross members throughout its length. At the front between the wheels is a vertical apron consisting of a plate 4 with converging wings 40 having flanged edges. The top flange 41 is secured to the upper flanges 23 of the side members 2 by gussets 25, the side flanges 42 to the troughs of the side members 2 and the wing flanges 44 to the inclined lower flanges 24 of the side members 2. The apron 4 has brackets 45 at the upper part of the wings 40, to support a transverse tube 101 attached to the front of the power plant 10. This tube helps to stiffen the apron 4 as well as providing two points of suspension for the power plant 10. The apron 4 has cylindrical indentations 46 at each side, with slots 460, to form part of the casing of the front wheel brake drums.

At either side of the power plant 10, brackets 32 project inwardly from the side members 2 to support the ends of the side brackets 102 of the power plant 10. These brackets provide two further points of suspension of the power plant. In rear of the transmission casing 11 and its yoke 12, is a cross plate 33 between the side members 2, and still further to the rear a second cross plate 34 between the side members 2 just before the rise of the arches 22. These cross plates 33 and 34 are flanged at their upper and lower edges and also at both ends. The end flanges are riveted to the troughs 20 of the side members, while gussets 25 secure the flanges 23 and 24 to the corresponding flanges of the cross plates 33 and 34. In each of these cross plates 33 and 34 are central apertures 330 and 340 with flanged edges 331 and 341 which are riveted to the torque tube 13 which passes through the apertures 330, 340. Secured to the front side of the plate 33 is a central plate 120 with horizontal bearings 121 at each side, which are coupled to the ends of the fork 12, and provide two further points of suspension for the power plant 10.

Brackets 35 extend downwardly from the side members 2 at the top of the rise of the rear arches 22, and support the ends of the transverse tube 36, which has a central bracket 360 extending rearwardly. Suspended on these brackets 360 is the differential casing 14 which carries the transverse spring mounting and is rigidly secured to the rear end of the torque tube 13.

The running boards 5 have flanged edges 51 riveted to the side members 2 on the outside, which they help to stiffen.

With a construction of this description, a chassis is provided having a frame of great rigidity and capable of resisting torsional and other stresses in all directions.

This is particularly advantageous in vehicles which are suspended on transverse springs and have individual wheel suspension.

It may however be readily adapted to the common form of unsprung differential, by disconnecting the differential casing from the central composite member, providing bearings for the driving shaft at the rear end of the torque tube, and flexible connections between the driving shaft and the gear of the differential.

With the frame as above described, the chassis is entirely free from unsprung weight, and forms a single suspended unit. This unit is of lighter construction, greater rigidity and permits greater spring deflexion than has hitherto been obtainable in this type of vehicle.

The mounting of the power plant on six points of suspension and the incorporating of it in the central frame member provides great stability as well as ease and facility in dismounting and removing when that is necessary.

The position of the cross members of the frame provides a well balanced chassis frame and a strong body support.

I claim:

1. In a chassis, a frame comprising a pair of side girder members narrowed and arched at each end and converging towards the front, a central composite member consisting of the power plant, the transmission casing, a torque tube having a bearing plate at its forward end and secured to a cross member, a fork rearwardly projecting from the transmission casing and pivoted to the bearing plate, and the differential casing rigidly connected to form a central stem member, and a series of cross members rigidly connecting the central member with the side members throughout their length.

2. In a chassis, a frame comprising two side girder members and a central composite member consisting of the power plant, the torque tube and the differential casing rigidly connected, and a series of cross members including a front apron between the side members with brackets supporting a transverse tube secured to the front of the power plant, side brackets to the power plant secured to brackets on the side members, cross plate members riveted and gusseted to the side members and riveted to the torque tube and a rear transverse tube bracketed to the side members and bracketed to the differential casing.

3. In a chassis, a power plant supported at the front by a transverse tube mounted in brackets on an apron between the side frame members, at the sides by brackets projecting from the power plant and secured to brackets on the side frame members and at the rear by a horizontal fork coupled to bearings mounted on a cross member riveted to the side frame members and adapted to form the forward part of the central stem.

4. In a chassis, a frame comprising side girder members, cross channel members secured thereto, a central torque tube riveted to the cross members, a differential casing bolted to the rear end of the torque tube, a tubular cross member mounted on brackets on the side members and secured centrally to the differential casing, a power plant bolted to a front tubular cross member, and secured to brackets on the side members and having a rearwardly projecting fork horizontally pivoted to a bearing plate on the forward cross channel member to which the torque tube is riveted.

5. In a chassis, a frame comprising side girder members, intermediate cross channel members and front and rear cross tubular members secured thereto providing supporting members for the power plant and differential casing and a central member including the power plant, a torque tube and a differential casing rigidly secured in line and to the cross members and adapted to provide a central stem to the frame.

JAMES A. WRIGHT.